United States Patent Office 2,824,039
Patented Feb. 18, 1958

2,824,039

FUNGICIDAL COMPOSITION

Kenneth S. Karsten, Westport, Conn., assignor to R. T. Vanderbilt Company, Inc., New York, N. Y., a corporation of New York No Drawing. Application March 6, 1953
Serial No. 340,917

3 Claims. (Cl. 167—30)

My invention relates to an improved fungicidal composition containing sodium pentachlorophenate.

Sodium pentachlorophenate is widely used in the treatment of green lumber in order to protect the lumber against fungus attack, particularly sap stain and mold growth. When used for this purpose, the sodium pentachlorophenate can be used alone, but generally it is used in admixture with various other materials. For example, sodium pentachlorophenate has been used in admixture with an alkali metal borate such as borax in a ratio of about one part by weight of pentachlorophenate to 1.5 parts by weight of the alkali metal borate. Also, sodium pentachlorophenate has been used in admixture with sodium bicarbonate and sodium carbonate in a weight ratio of about 50:33:17, and sodium pentachlorophenate has been used in admixture with an alkali metal borate, particularly borax, and modified soda.

The sodium pentachlorophenate, either alone or in admixture with materials of the type just indicated, is sold in the form of a dry powder which is admixed with water at the mill where the lumber is treated, generally in the range of about 5 or 10 pounds of powder being added per 100 gallons of water, the amount used depending upon the severity of the conditions promoting fungus growth, upon the degree of protection desired to impart to the lumber and upon other factors. The treatment of the lumber is a simple operation in which the lumber is dipped in the aqueous mixture containing the fungicide.

Sodium pentachlorophenate and fungicidal compositions containing it are normally dusty, and frequently cause the men working with the dry material to sneeze and cough. At the same time, sodium pentachlorophenate fungicides foam excessively when admixed with water in the preparation of the treating bath.

In accordance with my invention, I have discovered that dry powdered fungicidal compositions which contain sodium pentachlorophenate and which are normally dusty and produce a foamy solution when admixed with water can be rendered substantially dust-free and of greatly reduced tendency to foam when admixed with water by incorporating into such compositions a small amount of a high boiling petroleum hydrocarbon of high aromatic content.

As a specific illustration of the preparation of a composition which falls within the scope of my invention the following ingredients were thoroughly admixed:
59 percent by weight of commercial sodium pentachlorophenate (88 percent by weight active ingredients); 22 percent by weight of borax; 17 percent by weight of soda ash; and 2 percent by weight of a highly aromatic hydrocarbon oil comprising methylated naphthalenes and having the following characteristics:

A. P. I. gravity, 17.1°
Distillation, °F.
    Initial boiling point, 436
    50 percent, 496
    95 percent, 540
Mixed aniline point, °F., 81.6
Unsulfonated residue, 15–20 percent
Flash point, Cleveland Open Cup, 220° F.
ASTM Color, 2

This composition is used in the same manner in which sodium pentachlorophenate fungicides have heretofore been employed in the art. For example, in order to prepare a bath which is suitable for the treatment by dipping of green lumber, 5 or 10 pounds is admixed per 100 gallons of water, and when this is done the composition is substantially dust-free and of greatly reduced tendency to cause foam when the bath is prepared.

My invention is generally useful for the purpose of reducing the dusting and foaming tendencies of dry sodium pentachlorophenate fungicides. Such fungicides can be composed of sodium pentachlorophenate alone, but in commercial practice they will usually contain other ingredients, such as sodium carbonate, sodium bicarbonate or alkali metal borates, or a combination of these in amount up to about 75 percent, based upon the weight of the total composition, in order to improve the properties of the sodium pentachlorophenate.

A wide variety of high boiling petroleum hydrocarbons of high aromatic content are commercially available for use in preparing my composition. These hydrocarbons are distillates and preferably the ones which I use have an initial boiling point of at least about 350° F. and an unsulfonated residue of about 30 percent or less. The amount of hydrocarbon fraction used in preparing my composition can be varied considerably, depending upon the ingredients of the particular composition prepared and upon the degree of protection against dusting and foaming desired. In general, the amount of hydrocarbon fraction used will be within the range from about 0.5 to about 4 percent by weight, based upon the weight of the composition.

I claim:

1. A dry powdered fungicidal composition comprising at least about 25 percent by weight of sodium pentachlorophenate and containing from about 0.5 to about 4 percent by weight of a highly aromatic hydrocarbon oil comprising methylated naphthalenes characterized by an unsulfonated residue not exceeding about 30 percent and an initial boiling point not less than about 350° F.

2. A dry powdered fungicidal composition which contains essentially about 59 percent by weight of sodium pentachlorophenate, about 17 percent by weight of borax, about 26 percent by weight of soda ash and about 2 percent by weight of a highly aromatic hydrocarbon oil comprising methylated naphthalenes boiling within the range from about 436° F. to about 540° F. and characterized by an unsulfonated residue of about 15–20 percent.

3. A dry powdered fungicidal composition comprising sodium pentachlorophenate and containing from about 0.5 to about 4% by weight of a highly aromatic hydrocarbon oil comprising methylated naphthalenes.

References Cited in the file of this patent

UNITED STATES PATENTS

| | | |
|---|---|---|
| 270,998 | Taylor | Jan. 23, 1883 |
| 2,356,443 | Bissinger | Aug. 22, 1944 |
| 2,486,562 | Iamarino | Nov. 1, 1949 |

FOREIGN PATENTS

| | | |
|---|---|---|
| 36,077 | Denmark | June 7, 1926 |
| 471,243 | France | July 6, 1914 |

OTHER REFERENCES

Frear: Chem. of Insecticides, Fungicides and Herbicides, 2nd ed., D. Van Nostrand Co., Inc., N. Y. C., pp. 262, 263, 189–195, 1948.

Frear: Catalogue of Insecticides and Fungicides, vol. 2, 1948, pp. 19 and 55.

Hackh's Chem. Dictionary, Blakiston Co., Phila., 1944, p. 138.

U. S. DEPARTMENT OF COMMERCE
PATENT OFFICE

CERTIFICATE OF CORRECTION

Patent No. 2,824,039     Kenneth S. Karsten     February 18, 1958

It is hereby certified that error appears in the printed specification of the above numbered patent requiring correction and that the said Letters Patent should read as corrected below.

Column 2, line 43, for "17" read -- 22 --; line 44, for "26" read -- 17 --

Signed and sealed this 10th day of June 1958.

(SEAL)

Attest:

KARL H. AXLINE

Attesting Officer

ROBERT C. WATSON
Commissioner of Patents